Aug. 28, 1973  J. J. CLANCY ET AL  3,755,517
METHOD OF MAKING POROUS APPLICATOR STRUCTURES
Original Filed Jan. 19, 1968  3 Sheets-Sheet 2

John J. Clancy
John W. Rafferty
Robert C. Wells
INVENTORS

BY
Attorney

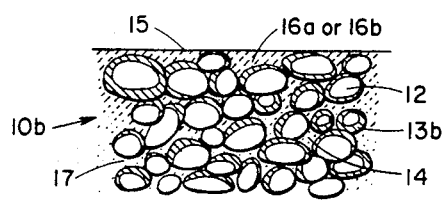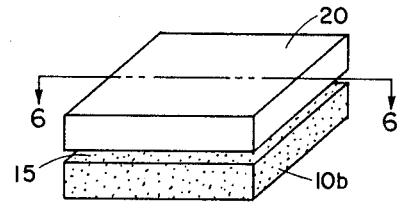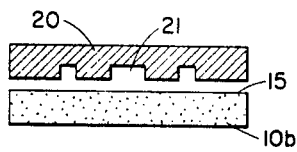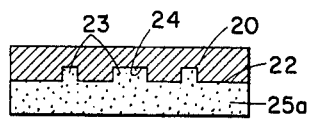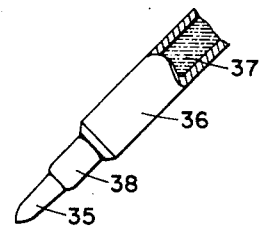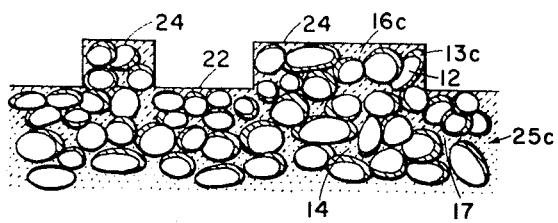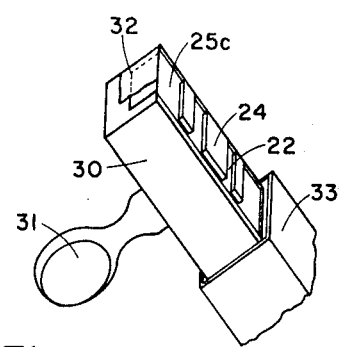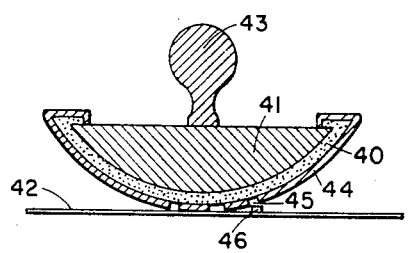

United States Patent Office 3,755,517
Patented Aug. 28, 1973

3,755,517
METHOD OF MAKING POROUS APPLICATOR STRUCTURES
John J. Clancy, Westwood, John W. Rafferty, Marblehead, and Robert C. Wells, Arlington, Mass., assignors to Arthur D. Little, Inc., Cambridge, Mass.
Original copending application Jan. 19, 1968, Ser. No. 699,243, now abandoned. Divided and this application Dec. 30, 1970, Ser. No. 102,960
Int. Cl. B29d 27/04, 27/08
U.S. Cl. 264—41
13 Claims

ABSTRACT OF THE DISCLOSURE

A method for making a porous structure and the resulting product capable of retaining a liquid and releasing it at a controlled rate with the application of pressure. The porous material is particularly well suited, by virtue of a resin binder gradient across its thickness, to the rapid, easy formation of self-linking stamps. The resulting stamps are capable of forming fine printed lines with high fidelity of outline.

---

This application is a divisional of our copending application Ser. No. 699,243, filed Jan. 19, 1968 and now abandoned.

Applicator structures are generally useful wherever a liquid is to be applied to a surface in limited amounts as in the application of water to a remoistenable adhesive layer on labels, stamps, envelope flaps, and the like; the application of medicaments or lotions to the body; the application of ink to printing devices; and the application of ink directly to an article or sheet to be marked as with an inked stamp. Porous applicator printing devices containing a supply of ink are commonly used as stamps, stamp pads and for similar printing purposes. Such devices generally consist of a resilient microporous body having a surface corresponding to the character to be printed and contain a reservoir of ink which is conducted to the surface through the porous structure.

The present invention is particularly suited to the manuacture of ink-containing printing structures. Heretofore, the manufacture of such devices has generally involved the molding of a suitable resilient solid material in the presence of a substance such as a filler, blowing agent or liquid, which imparts a reticulated network of voids throughout the structure. Typical techniques are described in U.S. Pats. 2,358,877; 2,777,824; and 2,763,208. For best all-around purposes, an applicator structure of this type should be easy to manufacture rapidly, as in a local stamp shop, and the final product should have as along a useful life as possible and should also be capable of having its supply or reservoir of liquid replenished from time to time.

In U.S. Pat. 3,019,201, a novel type of applicator structure is described which is capable of retaining a relatively large quantity of liquid which may be delivered from the surface in controlled amounts and in which the supply of liquid may be replenished. Briefly, the method described in U.S. Pat. 3,019,201 comprises binding together loosely packed generally spherical particles of a resilient material, preferably an elastomer, to produce a porous structure having a continuous interstitial phase consisting predominantly of the voids that would naturally occur between the packed particles making up the structure. In use, the interstitial regions of the applicator structure contain a supply of the liquid to be fed through the applicator to its applying surface, whether or not the surface is molded to a desired configuration. These interstitial regions are accordingly of capillary dimensions, which render them capable of retaining the liquid. The particles making up the porous structure must be of a material which will be wetted by the liquid to be retained and subsequently delivered at a controlled rate with the application of pressure.

The steps employed to effect the necessary bonding of the particles in U.S. Pat. 3,019,201 consist of washing or air cleaning the elastomeric particles to remove any films or particulate material, adding the cleaned rubberlike particles to an alcohol solution of resin binder (which may also contain a semi-solvent or a softening agent for the rubberlike particles), pouring the resulting slurry or paste into a mold, expressing excess liquid from the slurry in the mold, driving off any residual liquid with heat, and curing the structure either within or outside the mold.

The applicator structure of U.S. Pat. 3,019,201 is well suited to making ink pads, applying a limited quantity of liquid to a surface such as a remoistenable glue, and to the formation of self-inking stamps wherein the indicia to be stamped onto a surface are relatively large in size and where high fidelity of outline is not required. However, its manufacture is a rather difficult procedure to carry out and hence must generally be performed by a skilled workman in a laboratory or special shop.

In the teaching of U.S. Pat. 3,019,201 the slurry or paste, which has the rubberlike particles to be bonded suspended in the binder solution, is designed to be stored over an extended period of time so that it may be marketed as a product capable of being used in an easily and quickly prepared stamp by the process described. If, however, this slurry or paste contains any solvent or softening agent for the rubberlike particles, it tends to deteriorate over a period of time due to the fact that the solvent or softening agent gradually destroys the integrity of the rounded rubberlike particles which are to make up the final porous structure. However, as disclosed in U.S. Pat. 3,019, 201, it is known that a small amount of a softening agent enhances the bonding of the particles and the formation of the desired type of voids. Thus, when the slurry or paste contains a softening agent for the rubberlike particulate material, it is necessary to use it shortly after it is prepared. In like manner, any material which may cause the premature curing of the resin binder shortens the storage life of the slurry. Moreover, some difficulty has been encountered in attaining precise control over the degree of porosity in a finished structure prepared according to the teaching of U.S. Pat. 3,019,201.

Finally, if a porous structure of this nature is to be used for making a self-inking stamp, the surface which is molded to form the raised indicia of the stamp must be capable of producing a final outline having good clarity, good continuity, and high fidelity even for very narrow lines. This means that in the case of a self-inking stamp two essentially contrary requirements are, in fact, placed upon the porous structure—namely, it must have voids which permit the unrestricted flow of a fluid under pressure and a surface which is of a character which allows very accurate molding. These seemingly contrary requirements may readily be met in the porous structure of this invention.

Although the above discussed limitations on the structure of U.S. Pat. 3,019,201 have been found to be minor in many uses of the liquid-retaining porous structure made in accordance with that teaching, it would be desirable to have available a porous structure which has voids of controlled dimensions and size range and which is of such a character that its surface can be molded or contoured, as described, to form high-fidelity outlines. Moreover, it would be desirable to have an intermediate marketable porous product which can be stored over extended periods of time, which attains the optimum binding conditions, and which at the same time can be readily molded into a desired configuration with a minimum amount of time and equipment.

It is, therefore, a primary object of this invention to provide a method of forming a porous liquid-retaining structure with voids, the size and distribution of which may be accurately controlled. It is another object of this invention to prepare a structure of the character described which may be pressure-molded to form a self-inking stamp which produces sharpness and continuity of outline of the indicia impression, which is reinkable, and which has high tensile strength permitting it to be used to make many thousands of impressions. It is another object of this invention to prepare porous structures of the character described which are in the form of an easily handled, stable material which lends itself to ready and rapid molding in relatively simple equipment. It is yet another object of this invention to provide a method by which self-inking stamps may be easily formed in a short period of time.

It is another primary object of this invention to provide a novel process for preparing a porous structure, the surface of which may be easily molded to form stamps for high-fidelity printing, the stamps being capable of retaining a relatively large quantity of liquid for controlled release. It is yet another object of this invention to provide an improved novel type process for preparing a self-inking stamp or other liquid applicator. Other objects of the invention will in part be obvious and will in part be apparent hereinafter.

The invention accordingly comprises the several steps and the relation of one or more of such steps with respect to each of the others and the article possessing the features, properties, and the relation of elements which are exemplified in the following detailed disclosure, and the scope of the invention will be indicated in the claims.

The improved control of porosity is attained in the practice of this invention by the incorporation of water into a slurry of rubberlike particles in a resin solution. It is also, if desired, possible to use a controlled amount of water or other inert liquid in one or more subsequent steps to attain the desired void size and distribution. By casting the binder-coated particles and removing the free liquid, the resulting wet structure may then be dried with or without curing. Thus, it is possible to provide the material in the form of a dry or semi-dry structure which is not subject to any appreciable deterioration. This permits the use of a small amount of a softening agent in the dispersion, which in turn appears to enhance the action of the binder in its function of retaining the particles in the necessary spaced relationship.

For a fuller understanding of the nature and objects of the invention, reference should be had to the following detailed descriptions taken in connection with accompanying drawings in which FIG. 1 is a flow diagram of the steps of the method of this invention;

FIG. 4 is a much enlarged, schematic, and fragmentary cross section of the embodiment of FIG. 3, rendered suitable for molding to achieve high fidelity of outline;

FIG. 5 is a perspective view showing the first step in molding the porous structure of FIG. 4;

FIG. 6 is a cross section along line 6—6 of FIG. 5 prior to molding;

FIG. 7 is a cross section along line 6—6 of FIG. 5 showing the completion of the application of pressure to achieve molding;

FIG. 8 is a much enlarged cross section of the finished molded structure showing the raised and compressed areas of a typical stamp;

FIG. 9 illustrates a self-inking stamp constructed in accordance with this invention;

FIG. 10 illustrates a marking tool incorporating the porous structure of this invention; and FIG. 11 illustrates a tool for printing incorporating the porous structure of this invention.

The method of preparing a porous structure according to this invention and the products which result therefrom may be more clearly described with reference to the drawings. The first step (see FIG. 1) is the preparation of a slurry of the rubberlike particles, which are to form the porous structure, in a solution of a resin binder required to bond the particles. The solvent used in forming the resin binder solution is preferably a combination of two or more solvents, the liquid or liquids making up the major quantity being a solvent for the resin and a non-solvent for the rubberlike particles. The remaining minor quantity is preferably a solvent for the binder and a softening agent or semi-solvent for the rubberlike particles. The two or more liquids making up the solvent system should be miscible, and the solvent system should preferably be miscible with water. It is also within the scope of this invention to use a dispersion or a latex of the binder, in which case all or a portion of the water required to form the final dispersion may be introduced with the binder.

The rubberlike particles are then introduced into the resin solution preferably under conditions which provide good dispersion of individual particles in the liquid. Subsequent to the introduction of the rubberlike particles, a quantity of water is uniformly mixed into the slurry to obtain the desired degree of porosity in the finished product and to effect maximum deposition of the binder onto the rubberlike particles. This resulting dispersion is then filtered to form a wet mass. The filtrate, which is either discarded or purified for reuse, contains some of the impurities or coating originally associated with the rubberlike particles along with any of the binder which is not finally retained by them. The wet mass remaining after filtration is then cast into a structure, e.g., a sheet. Since the wet structure usually sets up rapidly with the draining off of the liquid, it is preferable that the casting take place simultaneously with the filtering, thus in effect combining the steps of filtering and of casting. If the porous structure is to be subsequently employed in the formation of an article which is to have at least one of its surfaces molded into a configuration, it is preferable during filtration and casting to contact at least one surface of the wet mass with a flat surface, e.g., a flat polished sheet of metal or a series of appropriate rolls, to smooth off the surface. This smoothed surface is subsequently used in molding. Such smoothing is preferably achieved without the application of any appreciable amount of pressure.

Figure 1:
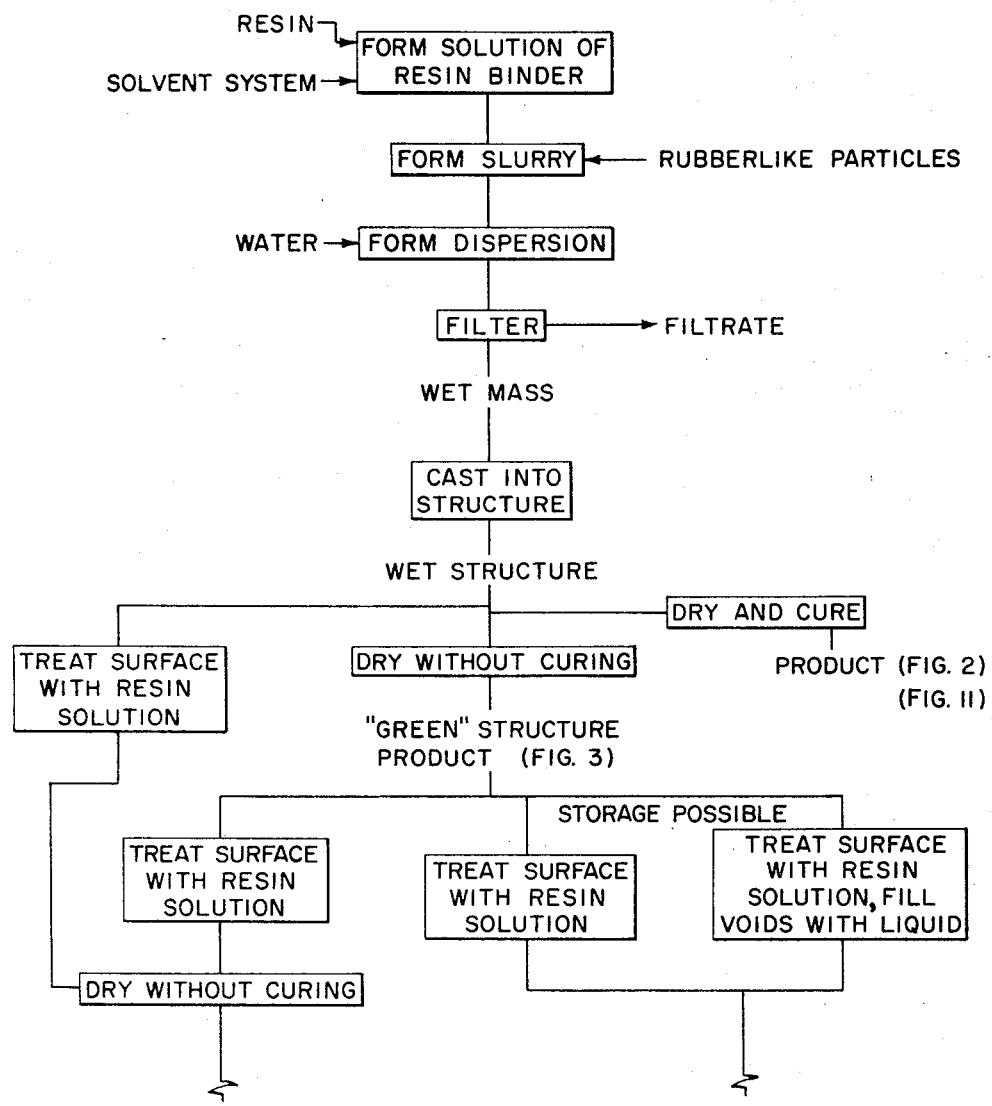
Figure 1:
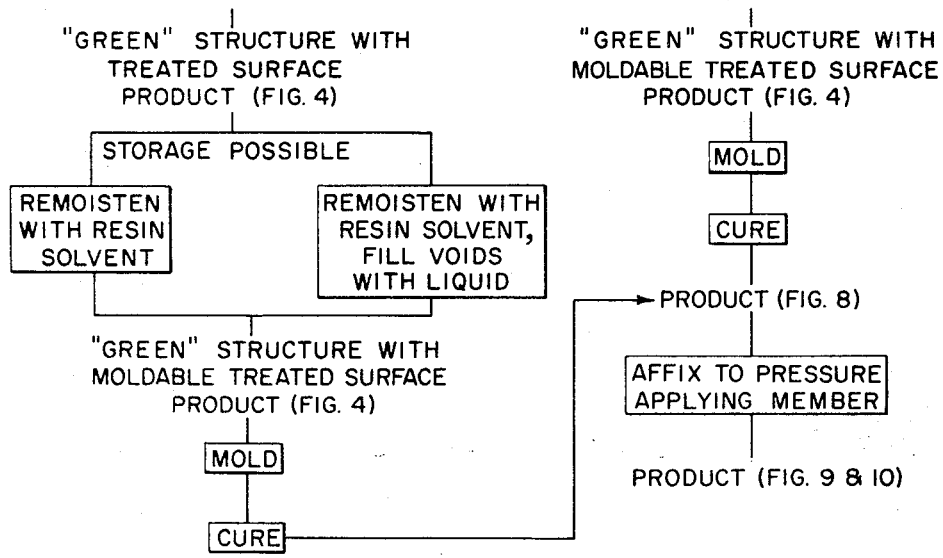
Figure 2:
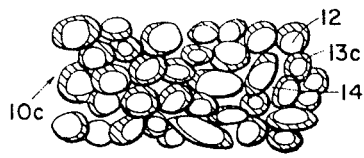
FIGS. 2 and 3 are much enlarged, schematic, and fragmentary cross sections of two embodiments of porous structures formed in accordance with this invention, FIG. 2 showing a structure suitable for applications which do not require molding, and FIG. 3 showing a structure suitable for further treatment for molding.

As will be seen in FIG. 1, the wet structure may be immediately dried at temperatures sufficiently high to completely cure the binder and the rubberlike material to make a usable end product. In complete curing, the resin binder is converted to an irreversible state, and the binder and rubberlike material react to at least some extent, thus enhancing the physical properties of the rubberlike material, particularly with respect to its toughness and resistance to solvents. A completely cured product is illustrated diagrammatically in the enlarged fragmentary cross section in FIG. 2. There it will be seen that the porous structure 10 is comprised of the rounded rubberlike particles 12, having the binder 13 distributed on at least a portion of their surfaces. (The lower case "c" is used to designate a cured resin binder.) The particles are packed without any appreciable pressure being applied so that they define voids 14 which make up the interstitial regions required to retain a liquid. It will be noted that the binder 13c does not need completely to coat each rubberlike particle 12. A product such as that illustrated in FIG. 2 is well adapted for use in ink pads, applicators for applying liquids to a surface, and for tip ends of pens, and the like, or for making self-inking stamps or for uses where high fidelity of outline is required or where fine lines are to be printed by stamping.

Returning now to FIG. 1, it will be seen that if a surface of the final porous structure is to be molded, it is treated with a solution of the resin binder before molding. The resin solution may be applied directly to the wet structure, prior to storage, after storage and just prior to molding, or at two or all of these stages in the process. Generally, it will be preferable to treat the surface just prior to molding. In all of these alternatives, any drying which is done prior to molding and curing is carried out at a temperature which is below that at which the binder and rubberlike material will be completely cured. This in FIG. 1 is designated as a "green" structure and provides an article which may be readily stored, handled, and sold for subsequent processing. This "green" structure is represented in simplified cross section in FIG. 3. It will be appreciated that the binder 13 in this "green" structure remains in an uncured state. Inasmuch as essentially all of the solvent system is removed from the "green" structure, that part of the solvent which is a softening agent for the rubberlike particles can no longer act on the surface of the rubberlike particles and effect any appreciable deterioration of them. Thus, this "green" structure, unlike the paste or slurry of U.S. Pat. 3,019,201, can be stored over long periods of time. If the "green" structure is to be stored for any extended period of time, it is preferable to enclose it within an essentially vapor-proof container to retain a small amount of the volatiles in the structure, thus making it more amenable to subsequent molding.

The novel product which results from treating at least one surface of the porous "green" structure with the resin binder solution is represented schematically in FIG. 4. It will be seen that here the porous structure formed of the rubberlike particles 12 held in proper relationship by the dry, but uncured, binder 13b to define voids 14 has a somewhat smoothed surface 15 developed by partially filling in of the voids with the binder 16a or 16b, the lowercase "a" being used to designate a binder solution and "b" to designate a dried, but uncured, binder. The binder 16 does not completely fill all of the voids, thus retaining some porosity, and this is indicated in FIG. 4 by the dotted cross hatching. Moreover, the binder only partially penetrates into the porous structure 10 as shown schematically by the lighter, less dense cross hatching identified by the reference numeral 17. The binder gradient, which is thus established across the thickness of the porous structure, is visibly evident in the case of a phenol formaldehyde binder, for there is a gradation of color from dark at surface 15 to light at the opposite surface. The binder used to form the treating solution is preferably the same as that used to bond the rubberlike particles, but this is not necessary so long as all of the binder is compatible with the rubberlike particles and can be wetted by the liquid to be retained.

If the structure, which has had at least one surface treated with the resin solution, has been stored, then it is necessary prior to molding to remoisten the resin-treated surface with a small quantity of the resin solvent to form what is termed in FIG. 1 a "moldable treated surface." If, however, the surface is treated with a resin solution just prior to molding, this step of remoistening is, of course, not necessary. It has been found that in this molding step it may be desirable to fill essentially all of the voids 14 of the structure (shown in FIG. 4) with water or some other suitable inert, removable liquid. Although this liquid will normally be removed, it could be retained within the structure. Thus, for example, if an ink were to be used which was nonvolatile and unreactive with the binder and rubberlike particles at the final curing temperature, it could serve as the void-controlling liquid during molding. It appears that the presence of this liquid in the voids during molding contributes materially to retaining the original voids both with respect to their size and to their distribution throughout the structure. The final molded product is capable of retaining considerably larger quantities of liquid than a comparable structure which has been molded without first filling the voids with a liquid.

In FIG. 5, as well as in the cross section of FIG. 6, it is shown how the porous structure represented in FIG. 4 is brought into contact with the mold to form a contoured surface—in this case, two narrow lines and one broad one. The resin-treated surface 15 of the porous structure of FIG. 4 is pressed against the mold 20. The mold 20 is a female mold having the required indicia, e.g., lines 21, incised therein. In pressure-contacting the porous structure 10b with the mold, the area 22 (FIG. 7) of the molded porous surface which surrounds the contoured indicia, and hence is to be the noninking surface, is the area which receives the maximum amount of pressure. In contrast, the areas 23 of the porous structure which contact the surface of the incised portion of the mold and which are to serve as the printing surfaces receive minimum pressure. This in turn means that those areas which are to be used as printing surfaces experience very little compacting, a fact which requires the surface to be relatively smooth prior to molding. Therefore, the role of the binder solution which has been applied on the surface is that of imparting to the surface the ability to assume the smooth indicia surface 24 of the mold in the absence of any appreciable pressure. The attainment of this smooth indicia surface on the molded surface of the porous structure is enhanced by having the surface binder in a slightly plastic state. This is accomplished by performing the molding step while some solvent is present in the resin binder.

Subsequent to the molding step represented in FIG. 7, the porous structure must be heated to a temperature which will effect the complete curing of at least that portion of the binder which must exhibit the physical properties desired. Thus, the porous structure may be completely cured throughout its entire mass or through only a portion of it. For example, in the preparation of a self-inking stamp, the molded surface must be cured to impart sufficient toughness and tensile strength to at least the resulting printing surface of the stamp. Thus, the heating may be more intense at the surface than in the interior of the stamp to provide a harder and tougher printing surface which is backed up with a softer ink reservoir.

The heating and curing may be accomplished while the porous structure remains in the mold or subsequent to its removal from the mold. Any suitable means for applying sufficient heat to effect the necessary curing may be used. Such means include, but are not limited to, exposing to a hot gas stream, placing in an oven, exposing to infrared radiation, dielectric heating, or contacting with a heated surface.

The molded and cured porous structure is illustrated in a much enlarged, schematic and fragmentary cross section in FIG. 8. It will be seen that the printing surfaces 24 retain essentially the original porosity of the porous structure, while the noninking, surrounding surfaces have been somewhat compacted. Since it is desired to have ink (or other liquid) flow out to the marking surfaces 24, this variation in surface porosity is desirable. The liquid to be retained within the porous, cured structure 25c may be introduced along one or more sides, at the molded surface or through the unmolded surfaces. It will, of course, be held in the voids 14 and subsequently forced to the marking surfaces 24 with the application of a positive pressure. In making a self-inking stamp, the ink to be retained in the voids may be introduced before or after the attachment of the molded porous structure to a suitable mounting member which is generally a member capable of permitting some pressure to be applied to the porous structure in order to discharge a controlled amount of liquid.

FIG. 9 illustrates one embodiment of a self-inking stamp constructed according to this invention and in which the porous structure is an integral component. The molded structure 25c of FIG. 8 is mounted in a grooved block 30 having a handle 31. The ink may be introduced before or after mounting. It may be convenient to seal the ends by means of a piece of tape 32 or other liquid-impermeable member after mounting; or to apply a liquid sealing lacquer on the ends or to all but the printing surface prior to mounting. Inasmuch as a self-inking stamp of this nature contains within the porous structure the ink required to effect the marking, it will generally be desirable to provide some type of cover or protective member which will prevent the printing surfaces 24 from making unwanted contact with another surface. In FIG. 9 this cover member takes the form of a lightweight plastic sheath 33 which may be easily slipped over the stamp. Any other means designed temporarily to cover the marking surfaces or to prevent them from making contact when the stamp is oriented into its marking position may also, of course, be incorporated.

FIG. 10 illustrates another embodiment of a marking tool incorporating the porous structure of this invention as an integral component. A tip 35 cut from the porous structure (FIG. 2 or FIG. 4) is affixed to a barrel 36 (containing liquid 37 in addition to that in tip 35) through a liquid channel 38. In a device, such as shown in FIG. 10, it may be desirable to coat all of the nonmarking sides of the tip 35 with a liquid impermeable film to control and limit the discharge of the liquid, e.g., ink, from the tip.

FIG. 11 shows in cross section the incorporation of a porous structure as an ink reservoir in a printing device. The particular device shown is one which is operated by hand. It could, however, be one which operated mechanically. A strip 40 of the porous material made in accordance with this teaching is mounted on a block 41 which can be easily rolled to contact a surface 42 by grasping handle 43. Over porous strip 40 is placed a stencil 44, having openings 45 cut in it. As the stencil surface is brought into pressure contact with surface 42, ink is delivered from strip 40 through the stencil opening 45 to be deposited as indicia 46 on the surface.

In order to function as a liquid discharging structure, certain requirements must be met by the components forming it. It is necessary that the particles which are bonded together to form the porous structure of this invention be somewhat resilient; and they are, therefore, referred to as rubberlike particles. They may be formed of natural rubber or of any one of the synthetic elastomeric materials such as copolymers of butadiene and styrene, copolymers of butadiene and acrylonitrile, polychloroprene, as well as other materials having similar elasticity and resilience. Inasmuch as the voids or interstitial regions of the porous material must be of a size and character which can retain a liquid and release it under pressure, it is necessary that the particles be packed to define these voids. This in turn indicates that it is preferable to use particles which are rounded or approach a spherical configuration. Moreover, the particles should generally be larger than 0.001 inch in diameter and less than about 0.01 inch. The sizes may be distributed within these limits. However, it is desirable that they are not present in a size range distribution which would normally lead to very close packing. The use of particles within this size range and the type of packing creates a porous structure which permits replenishment of the liquid once it is exhausted.

Among the binders which may be used are such materials as the phenolic (e.g., phenol formaldehyde), epoxy, vinyl and blocked isocyanate resins. Resorcinol-formaldehyde resins are also suitable for making porous structures where there are no long interruptions between the steps of the method.

Figure 3:
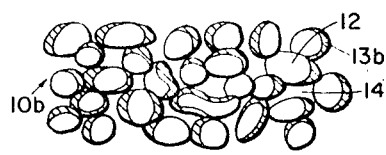

Any binder used must, of course, be compatible with the material forming the particles, and it must also be capable of being subjected to a limited amount of heat without completely curing if it is to be used as a binder to form products illustrated in FIGS. 3, 4, and 8. Further, as previously pointed out, any binder or binders must be compatible with and inert to the liquid to be contained in the structure.

As noted previously, the solvent for the binder should be a solvent system which preferably contains a minor quantity of a softening agent for the rubberlike particles. In general, it is preferred to use a mixture of one of the lower aliphatic alcohols and a ketone, the latter being the softening agent for the rubberlike particles. It is, of course, necessary that the major portion of the solvent system be a solvent for the resin binder and a nonsolvent for the rubberlike particles. The minor portion of the solvent system should be a solvent for the binder and a semi-solvent or softening agent for the rubberlike particles. It is also desirable that the solvent system be one which is readily removed by vaporization. Solvents suitable for making up the major quantity of the solvent system include, but are not limited to, ethyl alcohol, either alone or in combination with methyl alcohol, isopropyl alcohol, or other commercial grades of the alcohols, particularly the lower aliphatic alcohols. In addition to acetone, the softening agent may be methyl ethyl ketone, cyclohexanone, or the like. It is also possible to use other well-known organic solvents such as acetates and the like. Generally, the solvent system may contain up to about 15% by weight of the softening agent for the rubberlike particles. Any greater amount of this component in the solvent system is generally not desirable because of its action upon the surface of the rubberlike particles.

The resin solution, which is used to treat the surface of the porous structure which is to be molded, will generally be formulated in the same manner as the solution used to form the dispersion. This solution may also include a softening agent for the rubberlike particles. It will generally, but not necessarily, be the same solution used in forming the dispersion. It will, however, be usually preferable to use the lower concentration solutions to prevent blocking of the surface pores with resin.

In formulating the solution of the resin binder for making the dispersion, the resin concentration may vary over a relatively wide range. The actual choice of resin concentration will be determined by such factors as resin solubility, the final amount of resin which it is desired to precipitate out on the rubberlike particles, and the amount of liquid which it is desirable to process for a given amount of the wet structure to be formed. Thus, the determination of the optimum resin concentration in the resin solution may readily be made by one skilled in the art.

The slurry of rubberlike particles in the resin binder solution before addition of water is preferably formulated to have a solids (binder plus rubberlike particles) content between about 15 and 65% by weight; while the amount of resin preferably ranges between about 5 and 30% by weight of the rubberlike particles. Since the percentage resin retention on the rubberlike particles after filtering is within the range between about 60 and 90%, the final dry porous structure will contain about 3 to 25% resin binder based upon the weight of the rubberlike particles.

The amount of water added to the slurry of the rubberlike particles in the resin solution to form the dispersion should range between about 50 and 300 parts by weight of water to 100 parts by weight of the rubberlike particles. In general, the more water added the larger will be the percentage of void volume. However, since the water not only controls the ultimate void volume (or degree of porosity) but also the disposition of the resin, the quantity of water should be sufficient to cause substantially all of the resin to deposit out onto the surface of the rubberlike particles but less than that quantity which would cause any appreciable amount of the resin binder to form a separate phase or agglomeration of the binder in the dispersion.

If the cast wet structure is to be dried and cured to form a product which does not require surface molding, such as an ink stamp pad, the temperature used must be sufficiently high to cure the resin, at least in those portions of the porous structure where the physical properties of a cured binder are desired. The size, shape, and properties desired in the molded structure, and the type of resin used will all determine the optimum curing temperature and time for any one system. However, curing temperatures and times should not be such as to cause any appreciable thermal degradation of the resin binder or of the rubberlike particles.

If the porous cast material is to be formed first into a "green" structure (FIG. 1), then drying to form this "green" structure must be accomplished at a temperature below that at which any appreciable amount of the resin will be finally cured to an irreversible state. After molding, the final curing is carried out at a temperature and for a time sufficient to effect a complete cure of that part of the resin binder and rubberlike material desired to have the properties of the cured structure.

In the final porous structure, the interstitial regions making up the voids should amount to between about 15 and 60% of the total volume of the finished porous structure.

The invention will be further described with reference to the following examples which are meant to be illustrative and not limiting.

EXAMPLE 1

A resin binder solution was prepared by dissolving 8.1 parts by weight of thermosetting phenol-formaldehyde resin of the two-step type in a solvent system comprising a mixture of 73.8 parts by weight of Number 30 alcohol (ethyl alcohol denatured with 5% methyl alcohol) and 8.1 parts by weight of acetone. To this solution was then added 60 parts by weight of a dry fine copolymer of butadiene and acrylonitrile (present in a weight ratio of 60 to 40), at least 90% of which ranged in particle size between about 0.001 and 0.01 inch in diameter. After the rubberlike particles had been thoroughly blended into the resin solution to form a slurry, 120 parts by weight of water was added with high shear mixing to form the dispersion.

The dispersion was filtered on a coarse porous ceramic plate to cast a sheet of wet porous mass about ⅜ inch thick. A sheet of ¼ inch aluminum was laid on top of the wet cast sheet to smooth the surface which was subsequently to be molded.

A first sample of the cast sheet was then cut off and cured in an oven maintained at 126° C. for 30 minutes to form the product represented by FIG. 2. It had a porosity (void volume) of about 50% and was suitable as a stamp pad.

A second sample of the cast sheet was heated at 50° C. for 5 minutes to dry the structure but to leave the phenol formaldehyde resin binder and copolymer in uncured states. Just prior to molding the surface of this sample, it was sprayed with a phenolic resin solution identical in formulation to that used in preparing the porous structure. Molding was accomplished at room temperature by pressing the coated surface in contact with a female mold with just sufficient pressure to impart the mold configuration to the surface. After removing from the mold, the structure was dried and cured by placing in an oven at 120° C. for 30 minutes. It was found to have a porosity of 25%.

A third sample of the cast sheet was coated in the same manner as the second sample; but prior to molding, this sample was contacted on one of the uncoated sides with water to imbibe enough water to essentially fill all the voids. It was then molded and cured in the same manner as the second sample. This molded structure had a porosity of about 35%. It was then trimmed, and the nonmolded sides were painted with a lacquer consisting of 10 grams of ethyl cellulose dissolved in 100 cc. of toluene. When the lacquer had dried, the porous structure was mounted in a member such as is shown in FIG. 9 and was impregnated with a glycol-base stamp pad ink by dropping the ink onto the molded surface from a medicine dropper.

The resulting self-inking stamp produced fine lines which had good continuity, good clarity, and high fidelity of outline. It was capable of making at least ten thousand quality impressions before requiring reinking. It could then be readily reinked by dropping an additional quantity of ink on the molded surface and allowing it to penetrate into and fill the pores.

EXAMPLE 2

A slurry was made as in Example 1, and to it was added 180 parts by weight of water. The dispersion was cast as in Example 1 and porous structures were formed to correspond to the three different samples of Example 1. The finished products resembled those of Example 1, except that in each case the porosity was slightly higher due to the increase in the amount of water used in forming the dispersion.

EXAMPLE 3

The formulation of Example 1 was repeated using a resorcinol-formaldehyde resin in place of the phenol-formaldehyde resin binder of Example 1. Structures were obtained which were similar in properties to the comparable ones formed in Example 1. Since resorcinol-formaldehyde resins do not have an extended storage life, this resin binder is better suited to making dispersions which are processed to the final product without any extended storage periods intervening.

EXAMPLE 4

A resin binder solution was formed by dissolving 18 parts by weight of a solid epoxy resin having an epoxy assay of 450–520 and a melting point of about 65° C. (sold as EKR 2002 by Union Carbide Plastics Division) in a solvent formed of a mixture of 15 parts by weight of acetone and 110 parts by weight of Number 30 alcohol. To this was added 60 parts by weight of the copolymer of butadiene and acrylonitrile of Example 1 to form a slurry. After the rubberlike particles had been thoroughly blended into the resin solution, 150 parts by weight of water was added with high shear mixing to form the dispersion.

The dispersion was cast on a coarse porous ceramic plate and the wet structure processed in the three ways described in Example 1. Curing to form a "green" structure was accomplished by heating at 50° C. for 30 minutes and to an irreversible state by heating 85° C. for 15 minutes. Final curing of a molded surface was performed while the structure was still in the mold.

EXAMPLE 5

Generally spherical particles within the desired size range were precipitated from a natural rubber latex, the precipitant containing dimethylolurea, which is an accelerator for the liquid epoxy resin used. The resin had an epoxide equivalent of 180–195 and was one hold under the trade name of Epon 813 by Shell Chemical Co. Six parts by weight of the liquid epoxy resin was diluted with 100 parts by weight of Number 30 alcohol, and to this solution was added 60 parts by weight of the rubber particles. Sixty parts by weight of water was added to form the dispersion from which a wet structure was cast and dried at 40° C. for 30 minutes to form a "green" structure. One surface of this "green" structure was painted with the epoxy-alcohol solution and molded in a mold heated to 85° C. The structure was permitted to remain in the mold for 10 minutes to completely cure the molded surface and a portion of the porous structure directly underlying the molded surface.

The method of this invention permits the easy, rapid formation of devices incorporating a liquid reservoir. The ease with which a self-inking stamp may be formed for immediate sale or use may be described to illustrate this fact. This description begins after the formation of the "green" structure which may be packaged for future use and assumes the use of a phenolic resin. If it has received a resin treatment, then it is remoistened by a spray application of a little solvent and then pressed into a suitable mold. If it has not been treated, the treating solution is sprayed on. The mold with the porous structure still engaged or the porous structure alone is then placed in an oven at 150° C. for 2 minutes. The cured porous piece is then trimmed, attached to a block with a handle, the non-marking sides sprayed with a quick-drying lacquer or taped over, and ink dropped on the surface. The entire procedure should require no more than 7 to 10 minutes.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A method of forming a porous, liquid-retaining structure which possesses some resilience, comprising the steps of
   (a) adding rubberlike material in the form of small rounded particles ranging in diameter between about 0.001 and 0.01 inch to a solution consisting essentially of
      (1) a heat-activatable resin binder in an amount ranging between about 5 and 30% by weight of said rubberlike particles, and
      (2) a solvent system which is in combination a solvent for said resin binder and a softening agent for said rubberlike material, wherein said softening agent is present in an amount up to about 15% by weight of said solvent system;
   (b) incorporating said rubberlike material uniformly throughout said solution to form a mixture in which the solids content of rubberlike particles and resin binder ranges between about 15 and 65% by weight;
   (c) adding water to said mixture thereby to form a dispersion in which a major portion of said resin binder is affixed to said rubberlike particles, the amount of water ranging between about 50 and 300% by weight of said rubberlike particles;
   (d) filtering said dispersion to isolate said particles containing said resin binder as a wet mass;
   (e) casting said mass into a desired structure; and
   (f) drying said cast structure to remove substantially all of the liquid remaining in said structure, thereby to form a porous body having said particles bonded in spaced relationship to form voids capable of containing a liquid.

2. A method in accordance with claim 1 wherein said rubberlike particles are formed of a copolymer of butadiene and acrylonitrile containing about 40% by weight of acrylonitrile.

3. A method in accordance with claim 1 wherein said binder is a two-step type phenol-formaldehyde resin.

4. A method in accordance with claim 1 wherein said solvent system is a mixture of a lower aliphatic alcohol and a ketone.

5. A method in accordance with claim 1 wherein said drying of said cast structure is carried out at a temperature and for a time sufficient completely to cure said resin binder and said rubberlike particles.

6. A method in accordance with claim 1 wherein said drying of said cast structure is carried out at a temperature below that at which said resin binder is fully cured.

7. A method in accordance with claim 6 including the step of treating at least one surface of said cast structure with a solution of said resin binder prior to said drying.

8. A method of forming a porous, liquid-retaining structure which possesses some resilience, comprising the steps of
   (a) adding rubberlike material in the form of small rounded particles ranging in diameter between about 0.001 and 0.01 inch to a solution consisting essentially of
      (1) a heat-activatable resin binder in an amount ranging between about 5 and 30% by weight of said rubberlike particles, and
      (2) a solvent system which is in combination a solvent for said resin binder and a softening agent for said rubberlike material, wherein said softening agent is present in an amount up to about 15% by weight of said solvent system;
   (b) incorporating said rubberlike material uniformly throughout said solution to form a mixture in which the solids content of rubberlike particles and resin binder ranges between about 15 and 65% by weight;
   (c) adding water to said mixture thereby to form a dispersion in which a major portion of said resin binder is affixed to said rubberlike particles, the amount of water ranging between about 50 and 300% by weight of said rubberlike particles;
   (d) filtering said dispersion to isolate said particles containing said resin binder as a wet mass;
   (e) casting said mass into a desired structure;
   (f) drying the resulting cast structure to remove essentially all of the liquid therefrom at a temperature below that at which said resin binder is cured; and
   (g) treating at least one surface of the dried, but uncured, porous structure with a solution of said resin binder.

9. A method in accordance with claim 8 including the steps of
   (h) pressure molding the treated surface while it remains moist with said solution to form a contoured surface; and
   (i) heating the resulting molded porous structure at a temperature and for a time sufficient to completely cure at least a portion of said binder and said rubber like material in said structure.

10. A method in accordance with claim 8 including the steps of
    (h) filling essentially all of the voids with an inert liquid;
    (i) pressure molding the treated surface while it remains moist with said solution to form a contoured surface; and
    (j) heating the resulting molded porous structure at a temperature and for a time sufficient to remove all of the residual liquids and to completely cure at least a portion of said binder and said rubberlike material in said structure.

11. A method of forming a porous, liquid-retaining structure which possesses some resilience, comprising the steps of
    (a) adding rubberlike material in the form of small rounded particles ranging in diameter between about 0.001 and 0.01 inch to a solution consisting essentially of
       (1) a heat-activatable resin binder in an amount ranging between about 5 and 30% by weight of said rubberlike particles, and (2) a solvent system which is in combination a solvent for said resin binder and a softening agent for said rubberlike material, wherein said softening agent is present in an amount up to about 15% by weight of said solvent system;

(b) incorporating said rubberlike material uniformly throughout said solution to form a mixture in which the solids content of rubberlike particles and resin binder ranges between about 15 and 65% by weight;

(c) adding water to said mixture thereby to form a dispersion in which a major portion of said resin binder is affixed to said rubberlike particles, the amount of water ranging between about 50 and 300% by weight of said rubberlike particles;

(d) filtering said dispersion to isolate said particles containing said resin binder as a wet mass;

(e) casting said mass into a desired structure;

(f) drying the resulting cast structure to remove essentially all of the liquid therefrom at a temperature below that at which said resin binder is cured;

(g) treating at least one surface of the dried, but uncured, porous structure with a solution of said resin binder; and (h) drying the treated porous structure at a temperature below that at which said resin binder is cured.

12. A method in accordance with claim 11 including the steps of (i) remoistening the resulting dried treated surface with a liquid containing a solvent for said resin binder;

(j) pressure molding the remoistened surface to form a contoured surface; and (k) heat curing said resin binder and said rubberlike material.

13. A method in accordance with claim 11 including the steps of (i) remoistening the resulting dried treated surface with resin solvent;

(j) filling essentially all of the voids with an inert liquid;

(k) pressure molding the remoistened surface to form a contoured surface; and (l) heating said pressure-molded structure to remove said solvent and said liquid and to cure said binder and said rubberlike material.

References Cited
UNITED STATES PATENTS

| | | | |
|---|---|---|---|
| 1,993,278 | 3/1935 | Murphy et al. | 260—723 X |
| 2,754,274 | 7/1956 | Boyer | 260—2.5 M UX |
| 3,019,201 | 1/1962 | Clancy et al. | 260—2.5 B UX |
| 38,813 | 6/1863 | Davis | 264—129 |
| 1,251,182 | 12/1917 | Creque | 264—129 X |
| 1,959,160 | 5/1934 | Greenup | 260—723 |
| 3,376,158 | 4/1968 | Buser | 264—41 UX |

PHILIP E. ANDERSON, Primary Examiner

U.S. Cl. X.R.

161—162, 168; 260—2.5 R, 2.5 M, 723; 264—119, 134, 301, 307, 321, DIG. 13